US006942267B1

(12) United States Patent
Sturt

(10) Patent No.: US 6,942,267 B1
(45) Date of Patent: Sep. 13, 2005

(54) MULTI-PURPOSE OBJECT HOLDER WITH SELECTABLE SIZES

(75) Inventor: Alan Sturt, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/790,429

(22) Filed: Mar. 1, 2004

(51) Int. Cl.[7] ............................................... B60R 27/00

(52) U.S. Cl. ................. 296/24.34; 296/37.8; 296/37.1; 248/311.2

(58) Field of Search ............................ 296/24.34, 37.1, 296/37.8; 224/281, 484, 485, 926

(56) References Cited

U.S. PATENT DOCUMENTS

| | | | | |
|---|---|---|---|---|
| 4,453,759 | A * | 6/1984 | Kathiria | 296/37.8 |
| 4,708,386 | A * | 11/1987 | Moore et al. | 296/37.8 |
| 4,854,632 | A * | 8/1989 | Kreuze et al. | 296/37.12 |
| 4,927,108 | A * | 5/1990 | Blazic et al. | 248/311.2 |
| 5,052,649 | A * | 10/1991 | Hunnicutt | 248/311.2 |
| 5,071,002 | A * | 12/1991 | Bradley | 206/217 |
| 5,259,580 | A * | 11/1993 | Anderson et al. | 248/311.2 |
| 5,326,064 | A * | 7/1994 | Sapien | 248/311.2 |
| 5,330,145 | A * | 7/1994 | Evans et al. | 248/311.2 |
| 5,628,441 | A * | 5/1997 | Dykstra | 224/483 |
| 5,651,523 | A * | 7/1997 | Bridges | 248/311.2 |
| 5,660,433 | A * | 8/1997 | Bruhnke et al. | 297/188.17 |
| 5,720,514 | A * | 2/1998 | Carlsen et al. | 297/188.1 |
| 5,823,410 | A * | 10/1998 | Ackeret | 224/281 |
| 5,984,156 | A * | 11/1999 | Bridges | 224/566 |
| 6,039,296 | A * | 3/2000 | Nishina et al. | 248/311.2 |
| 6,050,468 | A * | 4/2000 | Kelley | 224/542 |
| 6,059,243 | A * | 5/2000 | Hikage et al. | 248/311.2 |
| 6,105,917 | A * | 8/2000 | Yabuya et al. | 248/311.2 |
| 6,168,059 | B1 * | 1/2001 | Salenbauch et al. | 224/539 |
| 6,315,153 | B1 * | 11/2001 | Osborn | 220/737 |
| 6,419,314 | B1 * | 7/2002 | Scheerhorn | 297/188.19 |
| 6,478,204 | B2 * | 11/2002 | Lange et al. | 224/539 |
| 6,499,785 | B2 * | 12/2002 | Eguchi | 296/37.8 |
| 6,616,206 | B2 * | 9/2003 | Luginbill et al. | 296/37.8 |
| 6,634,690 | B2 * | 10/2003 | Schaal | 296/37.1 |
| 6,702,352 | B2 * | 3/2004 | Nakanishi et al. | 296/37.8 |
| 6,719,344 | B2 * | 4/2004 | Ono et al. | 296/24.34 |
| 6,786,523 | B2 * | 9/2004 | Ogura | 296/24.34 |
| 6,796,591 | B2 * | 9/2004 | Yanagita | 296/37.8 |
| 6,817,584 | B2 * | 11/2004 | Ogura | 248/311.2 |
| 2003/0155786 | A1 * | 8/2003 | Kim et al. | 296/24.1 |

(Continued)

FOREIGN PATENT DOCUMENTS

| | | | | |
|---|---|---|---|---|
| DE | 4135316 A1 * | 4/1993 | | 224/483 |

(Continued)

*Primary Examiner*—Kiran B. Patel
(74) *Attorney, Agent, or Firm*—MacMillan, Sobanski & Todd, LLC

(57) ABSTRACT

An object holder assembly for a vehicle trim component has a vehicle trim body having an opening formed therein. A panel is movably mounted relative to the opening for movement between a retracted position and an extended position in the opening. The panel has a slot formed therein with the slot and the body being configured for receiving and supporting an object therein. The vehicle trim body defines a recess for receiving an object therein, and further can include a plurality of panels, each of the panels being slidably positioned within the recess for movement between the extended and retracted positions. Each of the panels also has a slot formed through a surface of the panel and each lower slot is successively smaller than each successively upper slot. The slots can have differently shaped slots formed therein and the plurality of panels can be stacked in a generally vertical manner.

20 Claims, 4 Drawing Sheets

U.S. PATENT DOCUMENTS

| | | | | |
|---|---|---|---|---|
| 2003/0197104 | A1 | 10/2003 | Heybl et al. | 248/311.2 |
| 2003/0209454 | A1 | 11/2003 | Hunter | 206/217 |
| 2004/0016858 | A1 * | 1/2004 | Bong | 248/311.2 |
| 2004/0130174 | A1 * | 7/2004 | Laskey | 296/37.1 |

FOREIGN PATENT DOCUMENTS

| | | | | | |
|---|---|---|---|---|---|
| JP | 05050876 | A | * | 3/1993 | 296/37.8 |
| JP | 05193417 | A | * | 8/1993 | 224/542 |

* cited by examiner

FIG. 7
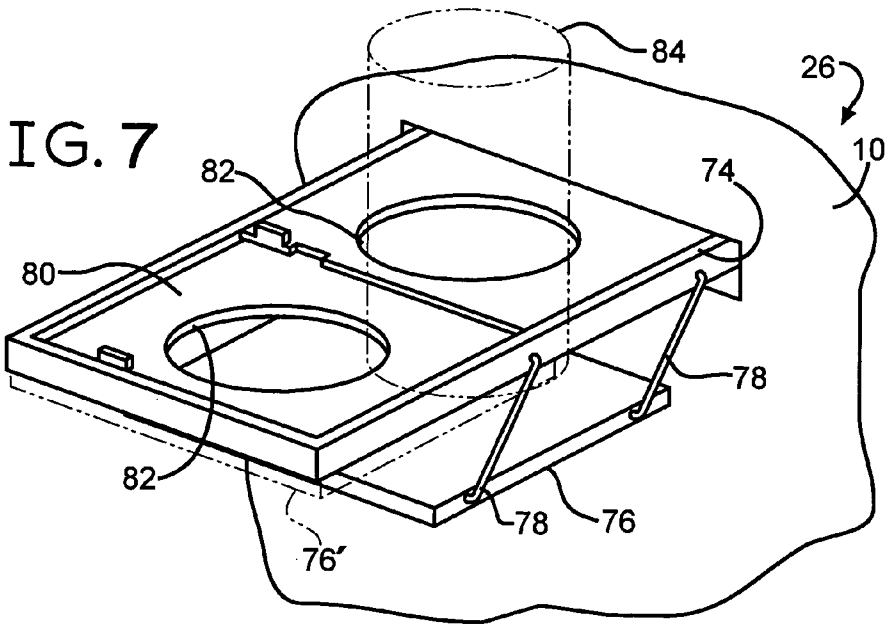
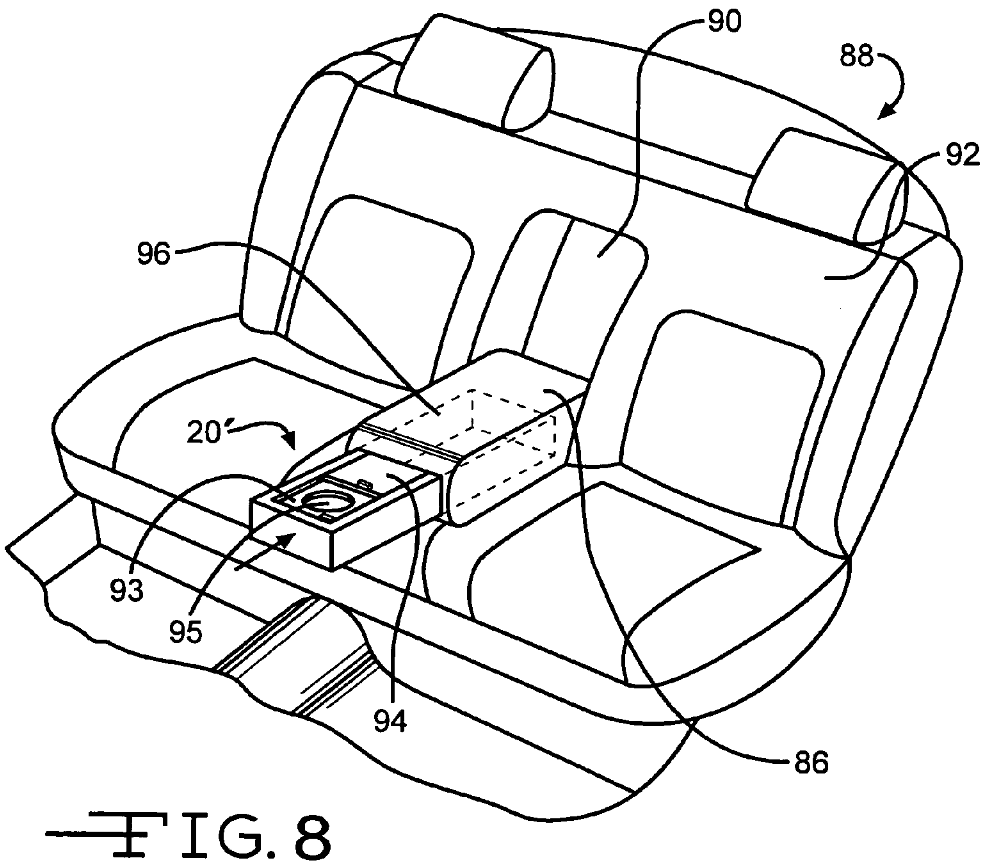
FIG. 8

MULTI-PURPOSE OBJECT HOLDER WITH SELECTABLE SIZES

BACKGROUND OF THE INVENTION

This invention relates in general to storage compartments, and more particularly to storage compartments for holding objects in vehicle passenger compartments with a size selector to more securely store the object.

Vehicle cup holder assemblies are popular in modern vehicle designs. Countless variations of cup holder assemblies exist, each variation having varying degrees of efficiency, practicality, manufacturability and cost. Vehicle interior designers have continuously modified cup holder designs to improve aesthetics of the design and to improve functionality as cost constraints continue to tighten. The ideal design would be inexpensive to manufacture, simple to assemble, be aesthetically pleasing, and provide improved functionality such that it could securely hold a variety of shapes and sizes of cups. Accordingly, it is desirable to provide an improved vehicle cup holder assembly that achieves these stated goals while reducing the cost of manufacturing and assembly.

Similarly, in recent years, the use of mobile phones and other electronic devices by occupants of motor vehicles has increased substantially. The term "mobile phone" as used herein is intended to include wireless telephones, such as analog or digital cellular phones, PCS (personal communication systems), or other portable transmitter/receiver devices used for personal communication. Also, the rise in the use of personal digital assistant devices (PDA), notebook computers, Global Positioning Satellite receivers, and other "BLUETOOTH" compatible hardware has increased substantially. Thus, these devices are widely used in vehicles. However, most vehicles do not provide storage locations for securely holding these devices in place. Usually, these devices are simply laid across a seat, on the floor, or placed in a cup holder. Therefore, it is desirable to provide a structure for storing a portable phone, or other electronic device in a vehicle wherein the portable phone or other electronic device can be hidden from view, or securely held in place while being easily accessible for use by a vehicle driver or other vehicle occupant.

Thus, it would be advantageous if an improved holder for supporting differently shaped articles or objects in a vehicle could be developed.

SUMMARY OF THE INVENTION

This invention relates to an object holder assembly for a vehicle trim component with a vehicle trim body having an opening formed therein. A panel is movably mounted relative to the opening for movement between a retracted position and an extended position in the opening. The panel has a slot formed therein with the slot and the body being configured for receiving and supporting an object therein. The vehicle trim body defines a recess for receiving an object therein, and further can include a plurality of panels, each of the panels being slidably positioned within the recess for movement between the extended and retracted positions. Each of the panels is also has a slot formed through a surface of the panel and each lower slot is successively smaller than each successively upper slot. The slots can have differently shaped slots formed therein and the plurality of panels can be stacked in a generally vertical manner.

In alternate embodiments, the object holder assembly is retractable relative to a vehicle console member. Alternatively, the panels of the object holder assembly include an arm slidably mounted on the panel adjacent the slot for effectively increasing or decreasing the size of the slot. In this embodiment, the object holder assembly includes having either the arm or the panel having detents formed thereon and the other of the arm and panel including spurs received in the detents to help prevent movement of the arm relative to the panel. The object holder assembly can include a base positioned below the panel for vertically supporting a lower portion of an object. The lower platform is movably mounted in a generally vertical direction relative to the panel. The panel can also be formed from a plurality of strips connected together.

Various objects and advantages of this invention will become apparent to those skilled in the art from the following detailed description of the preferred embodiment, when read in light of the accompanying drawings.

BRIEF DESCRIPTION OF THE DRAWINGS

FIG. 7 is a perspective view of an alternate embodiment of an object holder assembly according to the present invention.

FIG. 8 is a perspective view of an alternate embodiment of an object holder assembly according to the present invention.

DETAILED DESCRIPTION OF THE PREFERRED EMBODIMENTS

Figure 1:
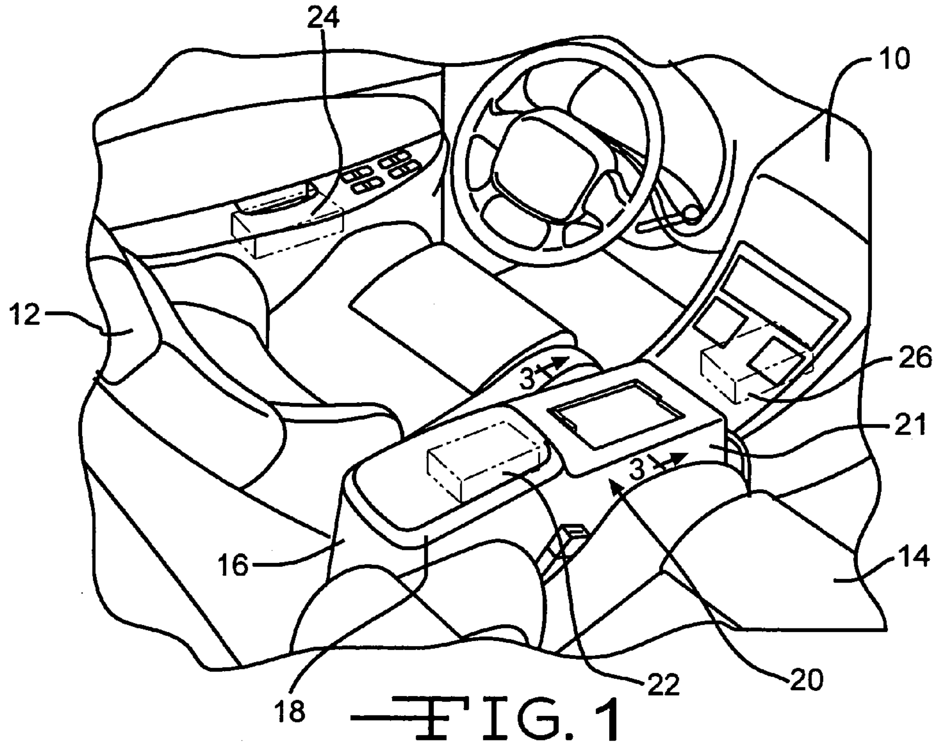
FIG. 1 is a view of the interior of a passenger compartment of a vehicle having an object holder assembly according to the present invention.

Referring now to the drawings, there is illustrated in FIG. 1 the interior passenger compartment of a vehicle having various trim bodies and panels. Indicated generally at 10 is an instrument panel or dashboard. Positioned within the instrument panel 10 are visual gauges for the driver's convenience, and temperature and climate controls. Other controls, storage compartments and stereo controls can be positioned on a lower console. Also located within the passenger compartment is a glove box, and a driver seat 12 and passenger seat 14. Positioned between the passenger seat 14 and the driver seat 12 is a storage compartment 16 that has a lid 18 that can also serve as an armrest. The storage compartment 16 can be accessed by lifting the armrest lid 18. An overhead console (not shown) can also be accessible from within the interior passenger compartment of the vehicle. The overhead console can contain various controls, such as a garage door opener, climate controls, etc. The overhead console can also contain storage compartments for sunglasses, portable media, or a mobile phone. Positioned between the driver seat 12 and the passenger seat 14, and connected with the storage compartment 16, there is a second storage compartment or object holder assembly 20.

Figure 3:
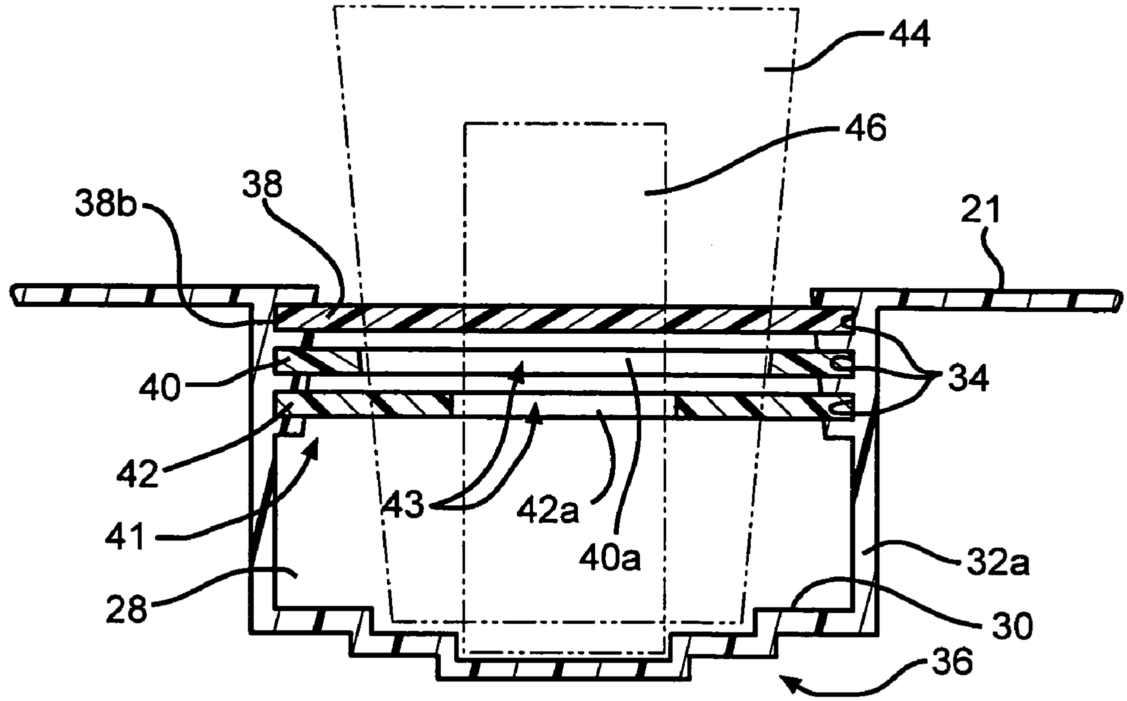
FIG. 3 is a cross-sectional view of the object holder assembly shown in FIG. 1 through Line 3—3.

The object holder assembly 20 (shown in a closed position) is preferably formed as a part of the center vehicle console body 21 and can be used to receive any desired object. The object may be any component that is desired to be restrained within the passenger compartment of the vehicle. For example, the object may be a beverage container, as shown in FIGS. 3 and 7, and described below. It is anticipated that the beverage container will have a generally cylindrical shape (e.g. soda can) or a generally tapered cylindrical shape (e.g. fountain drink or coffee container). However, the object may be any removable item such as a mobile phone, PDA, sunglasses, cigarette box, or portable media, and have any shape. Also, a larger object holder assembly can also be implemented in accordance with this invention such that a notebook computer or other larger object can be supported therewith.

Although the object holder assembly of the present invention is shown as being positioned in a center console of a vehicle, it should be understood that the object holder assembly 20 can be located in any suitable vehicle trim body, for example, inside the armrest storage compartment 16 (shown schematically at 22), a door panel (shown schematically at 24), an instrument panel 10 (shown schematically at 26), a glove box, another floor console, a quarter panel trim, or in an overhead console. The object holder assembly 20 could be also be positioned horizontally, vertically, or at any suitable angle. Additionally, a separate object holder assembly could be positioned for direct access by passengers in a rear seat, such as in a second overhead console, second floor console, second door panel, or second quarter trim panel.

Figure 2:
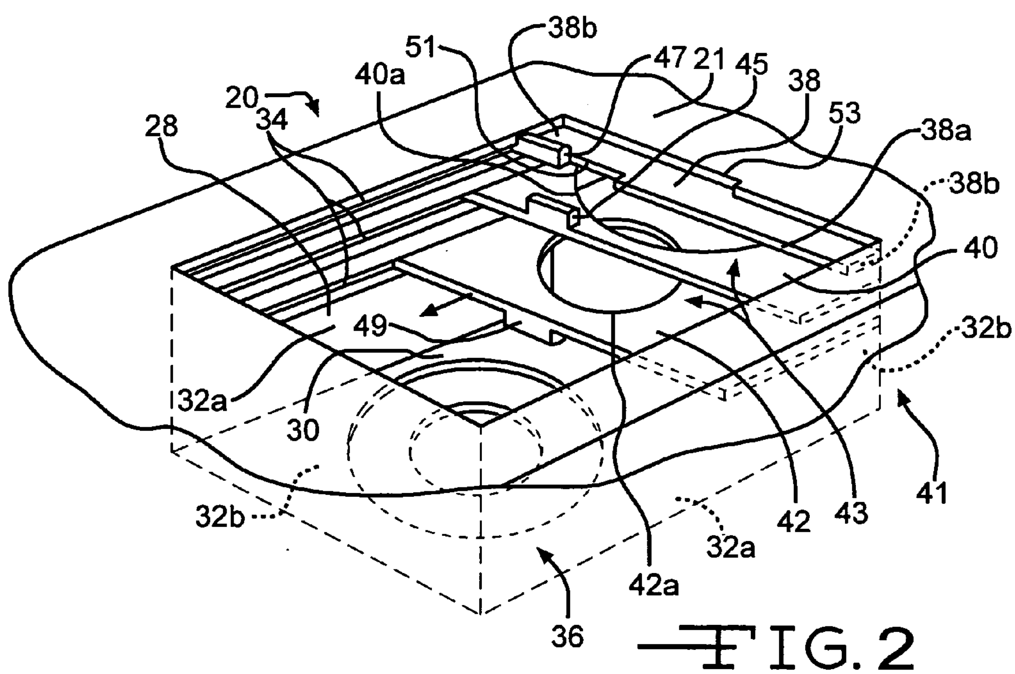
FIG. 2 is an enlarged perspective view of the object holder assembly of the present invention with panels in an intermediate position.

Illustrated in FIG. 2, there is an enlarged perspective view of the object holder assembly 20 shown in FIG. 1. Although the object holder assembly 20 is shown having a generally rectangular shape, it should be appreciated that the object holder assembly 20 could be square, circular, or have any desired shape. In FIG. 1, the object holder assembly is shown in a closed position. Thus, the cover, and optionally the panels, are in an extended position, as will be discussed below. Illustrated in FIG. 3, a cross-sectional view of the object holder assembly through Line 3—3 is shown wherein the cover and panels are shown in their extended positions. In FIG. 2, the object holder assembly is shown with the cover and multiple panels positioned in intermediate positions.

Illustrated in FIG. 2, a portion of a vehicle console 21 having a object holder assembly 20 formed thereon is shown. The object holder assembly 20 defines a recess 28 formed within the vehicle console 21. The recess 28 is defined by a base 30 and generally vertical walls 32*a*, 32*b* extending from each edge of the base 30. The recess 28 is adapted to receive an object therein. The shape of the base 30, and thus, the shape of the recess 28 is generally rectangular. A first pair of opposed walls 32*a* define the side walls of the object holder assembly, and a second pair of opposed walls 32*b* define the end walls of the object holder assembly. Formed on each of the side walls 32*a* are at least one set of slots or tracks 34. The tracks 34 are preferably generally parallel to the base 30 of the object holder assembly 20 and are formed generally directly opposite each other. In a preferred embodiment, a plurality of such pairs of tracks 34 are formed on each of the side walls 32*a*. The tracks 34 are further preferably vertically spaced along the height of the side walls 32*a*, with the spacing being, at a minimum, equal to the thickness of each panel described below. In FIG. 2, the tracks 34 are only shown on one side wall 32*a* for purposes of clarity. The base 30 can be formed having a stepped portion 36, or a plurality of concentric recessed rings, formed thereon such that a bottom of the object can be received within the steps 36. However, the base 30 can also be flat with no design formed thereon, or have any other suitable design formed thereon, or any other structure designed to prevent lateral motion of the object received therein.

In a preferred embodiment, a cover panel 38 is received within the uppermost set of tracks 34. The cover member 38 is a continuous and generally thin and flat component that is adapted to be positioned over the recess 28. The cover panel 38 includes a front end 38*a*, a pair of side ends 38*b*, and back end (not shown). The side ends 38*b* of the cover panel 38 are supported within the uppermost tracks 34 such that the cover panel 38 is selectively slidable between a retracted and extended position. The length of the cover panel 38 is preferably such that a portion of the cover panel 38 is retained within the vehicle console 21 when the cover panel 38 is extended to fully cover the recess 28. In addition, the vehicle console 21 is preferably sized to receive the majority of the cover panel 38 therein when the cover panel 38 is in the retracted position. In an alternate embodiment, a cover panel can also be a pivoting panel such that the cover panel is pivoted away from the vehicle console 21. The pivoting cover member can be pivotally attached to the vehicle or can be removable with respect to the vehicle console 21. It should be appreciated that any suitable cover member can be used in accordance with the present invention such that the cover covers the recess 28 when in a covering position and can be moved or removed to provide access to the recess 28.

When the cover panel 38 is in a retracted position (generally shown in FIG. 2), or is removed, the recess 28 is accessible to an occupant of the vehicle. Positioned adjacent the recess 28 is at least one, and preferably a plurality of, panels 40 and 42, and referred to collectively at 41. This is best illustrated in the cross-sectional view of the object holder assembly in FIG. 3. Each panel 41 is preferably received within each pair of opposed tracks 34 formed on the side walls 32*a* of the object holder assembly 20. Each panel 41 is substantially similar to the cover panel 38 described above. However, each panel 41 also includes a slot, indicated generally (and referred to collectively) at 43 formed therethrough. Each panel 41 can be moved between a retracted position and extended position. In the extended position (panel 42 being shown partially extended in FIG. 2) the panels 41 are positioned such that the panel 41 substantially covers the recess 28. However, the slot 43 formed on the panel 41 provides limited access to the recess 28 formed through the panel 41. Thus, the size of the slot 43 formed on the panel 41 determines the size of the object that can be received within the slot 43, and thus, the recess 28. Therefore, differently sized slots 40*a*, 42*a* formed in the panels 40, 42, respectively, are adapted to selectively limit the size of the object that can be received within the recess 28 through each panel 40, 42. In addition, the slots 40*a*, 42*a* formed on the panels 40, 42, can be used to secure differently sized objects within the recess 28 depending on the panel 41 selected and the relative size of the object.

In the cross-sectional view of FIG. 3, a first beverage container 44 positioned within the recess 28 is shown by phantom lines. A second differently sized beverage container 46 positioned within the recess 28 is also shown by phantom lines. The larger object, such as a large-sized fountain drink container 44, would be better received within a slot 40*a* that conforms to the general outer diameter of the container 44 than a smaller container 46 placed within that same slot 40*a*. Thus, the user of the object holder assembly 20 can select the panel 41 having a slot 43 formed therethrough based on the size and shape of the object that most suitably conforms to the shape of that slot. By selecting a panel 41 that generally matches the size and shape of the object placed therein, the edges of the slots 41 can provide lateral support to the object received in the recess 28 and the selected slot 40*a*, 42*a*. As can also be seen in FIG. 3, is the base 30 of the object holder assembly 20 has a stepped configuration 36. Although it is shown that each stepped portion generally conforms to the size of a slot 43 positioned above the base 30, it can be appreciated that the steps 36 can have any suitable configuration, shape, and size. In addition, although only two panels 40, 42 and one cover panel 38 are illustrated in the Figures, it should be appreciated that any number of panels can be provided within the recess 28 and that the panels 41 can have any desired shape. Further, beverage container panels 41 (such as those shown in the Figures) can be adapted to laterally support a beverage container 44, 46, while other panels having a shape generally matching the shape of a mobile phone or PDA can be provided adjacent the beverage container panels 41 and within the recess 28 to support a mobile phone or other object.

For clarity purposes, there is illustrated in FIGS. 2 and 3, the object holder assembly 20 according to the present invention with the panels and cover in partially extended positions. Thus, FIG. 2 illustrates the relative motion of the panels 43 within the recess 28 of the object holder assembly 20. Also shown in FIGS. 2 and 3, there are a plurality of upwardly extending tabs 45, 47 formed on the uppermost panel 40 and the cover panel 38. A downwardly extending tab 49 is shown formed on the lowermost panel 42. The tabs 45, 47, 49 are used for an operator of the panels 38, 40, 42 to grip while selectively sliding the panels 38, 40, 42 between a retracted and extended position. The tab 47 formed on the cover panel 38 can have any position, but is preferably formed on the corner between one of the side ends and the front end of the cover panel 38. A successively lower panel 40 also preferably has a similar tab 45 formed thereon. The tab 45 preferably is positioned in a staggered alignment to the cover tab 47 such that the panel 40 can be more easily identified and more easily selected. The vehicle console 21 can also include identifying indicia (not shown) marked thereon such that the user of the object holder assembly 20 can quickly identify which tab 45, 47, 49 (and panel 38, 40, 42) is to be selected based upon the object the user wishes to place within the recess 28. The lowermost tab 49 is shown extending in a downward direction so as to not interfere with the motion of the upper panel 40 and the cover panel 38. As shown, when the cover panel 38 is moved to the extended position, the upper panel 40 will be carried therewith into the extended position. However, the lower panel 42 can be moved separately from the cover panel 38 and upper panel 40. In a further preferred embodiment, the cover panel 38 and upper panel 40 can have a recess 51 formed thereon to accommodate the tab 45 formed on the adjacent panel 40 such that the panels 38, 40 can be moved together more closely when in the fully extended or retracted position. Similarly, the vehicle console 21 can also have such a recess 53 formed thereon for the same purpose. In this embodiment, when a successively upper tab is selected, each successively lower and adjacent tab would move therewith. For example, in the embodiment illustrated in FIG. 2, when the cover panel 38 is selected, movement of the cover panel 38 will cause the cover recess 51 to engage the tab 45 of the upper panel 40 such that the upper panel 40 will also move when the cover panel 38 is extended. Similarly, when the panels 38, 40 are in the extended position, moving the tab 45 on the upper panel 40 will cause the cover panel 38 to slide therewith. Although only two panels 40, 42 and a cover panel 38 are illustrated in FIGS. 2 and 3, it should be appreciated that any number of panels can be used with the object holder assembly 20 according to the invention. Also, the tabs can extend in any direction and have any desired configuration such that the user can more easily identify which panel is desired to be moved and to more easily move that panel.

Figure 4:
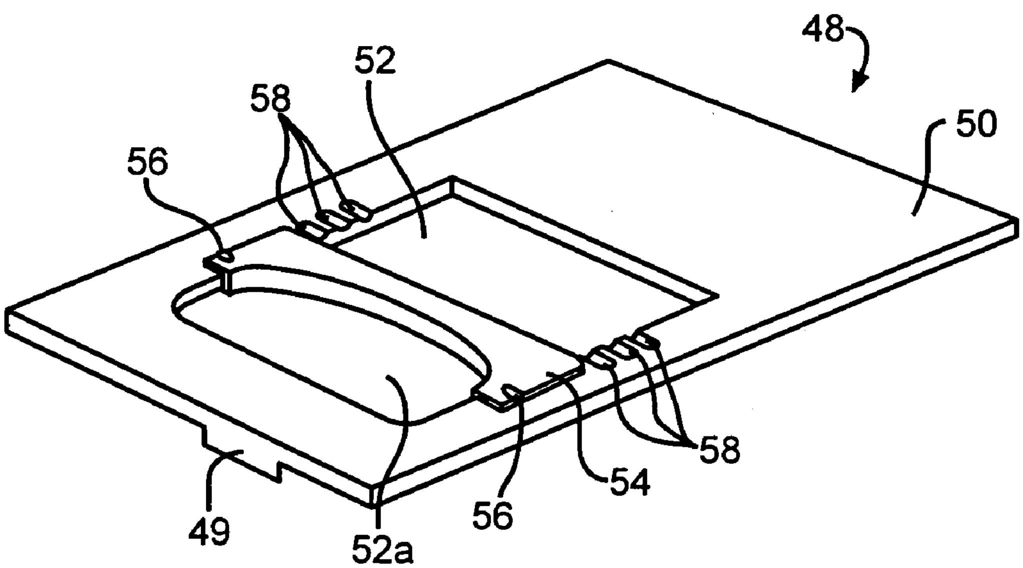
FIG. 4 is a perspective view of an alternate embodiment of a panel for use with the object holder assembly shown in FIG. 2.

Illustrated in FIG. 4, there is shown an alternate embodiment of a panel 48 that can be used as one or more of the panels 41 with the object holder assembly 20 according to the present invention. The adjustable panel includes a body portion 50 that is substantially similar in construction and material to that which is shown and described above. Also, the adjustable panel body 50 has a slot 52 formed therein to receive an object therethrough. It is expected that this embodiment of the panel 48 is most easily used with a mobile phone, PDA, or other similarly sized and shaped object. However, any object, such as compact discs, or a beverage container, could be used with this panel 48. Also formed on the panel 50 is a slidable arm 54. The slidable arm 54 is slidable along the length of the panel 50 such that movement of the slidable arm 54 towards one end of the panel 50 reduces the size of the opening 52*a* of the slot 52. Thus, the slidable arm 54 can be positioned to laterally support an object placed within the opening portion 52*a* of the slot 52 depending on the size of the object. Moving the slidable arm 54 in the other direction would increase the size of the opening 52*a* of the slot 52 in the panel 50. The position of the slidable arm 54 can be maintained using any suitable mechanism. However, in the preferred embodiment, the lateral ends of the slidable arm 54 that engage the edges of the panel 50 include a spur 56. Each spur 56 can be used to frictionally engage a pair of opposed detents 58 formed at spaced apart positions on opposite lateral edges of the panel 50. Although the panel 50 is shown as having only a single generally rectangular slot 52 formed therethrough, it can be appreciated that the panel 50 can also include other shaped openings in order to receive other objects therein as well.

Figure 5:
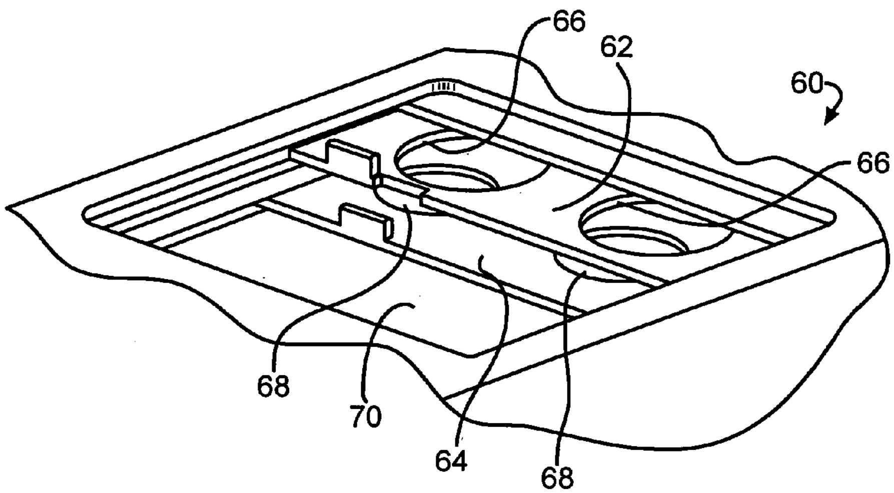
FIG. 5 is a perspective view of an alternate embodiment of an object holder assembly according to the present invention.

In an alternate embodiment, illustrated in FIG. 5, a tandem object holder assembly is shown, indicated generally at 60. The construction and operation of the tandem object holder assembly 60 is substantially similar to that which was described above with respect to the embodiments shown in FIG. 2. The panels 62 and 64 shown in FIG. 5 are also similar to those shown in FIG. 2, except that the panels 62 and 64 include a pair of slots 66 and 68 formed therethrough. The panels 62 and 64 are received within a recess 70 that is formed within a vehicle console, similar to that which is described above. Such a tandem panel slot design can include laterally spaced or longitudinally spaced slots depending on the size and space available on the vehicle console. Successively upper panels 62 and lower panels 64 could also have the tandem design such that multiple objects can be placed within the recess 70. Although the slots 66 and 68 are shown in the tandem design as having the same sized slots in a single panel, 62 and 64 respectively, it can be appreciated that a panel can include slots having two differently sized slots formed therethrough as well.

Figure 6:
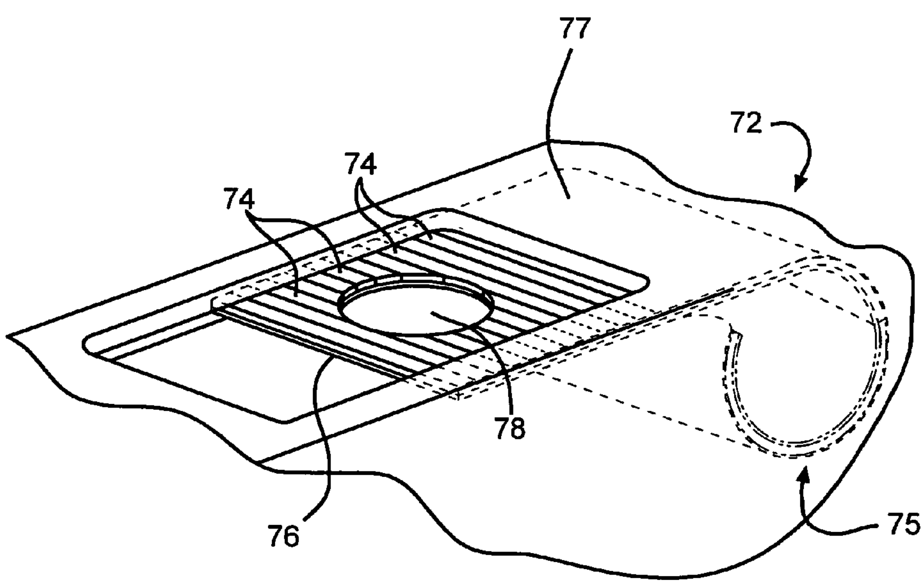
FIG. 6 is a perspective view of an alternate embodiment of a panel for use with the object holder assembly shown in FIG. 2.

Illustrated in FIG. 6 is an alternate embodiment of a panel 72 to be used in accordance with the present invention. The panel 72 is formed substantially similarly to that of a tambour panel wherein a plurality of semi-rigid strips 74 are affixed to a flexible material member 76. The panel 72 preferably includes a slot 78 formed therethrough such that an object can be placed therein, substantially as described above. However, in this embodiment, the panel 72 is rolled in a direction normal to the elongated strips 74 as the panel 72 is moved to a retracted position (shown in phantom at 75) into the vehicle console 21, similar to the front of a rolltop desk. The panel 72 may be rolled along or in a curved fixture (not shown) to guide the panel 72. Also a plurality of such tambour panels 72 could be disposed within the object holder assembly 72, each being retractable and extendable, substantially as described above. Thus, this embodiment allows the panel 72 to occupy less space within the vehicle console 21 when in the retracted position 75. Although the semi-rigid strips 74 are not shown illustrated on the hidden portion 77 of the panel 72 that is received within the vehicle console, it should be appreciated that the semi-rigid strips 74 extend the length and width of the panel 72. The portion of the semi-rigid strips 74 that extend into the sides of the vehicle console 21 are shown in hidden lines, but the portion 77 of the panel 72 received within the rear of the vehicle console 21 are not shown for the purposes of clarity. Additionally, the length of the panel 72 can be longer, shorter or have any suitable size in accordance with the desired parameters of an object holder assembly.

Illustrated in FIG. 7 is an alternate embodiment of an object holder assembly, indicated generally at 26 (also shown in FIG. 1). In this embodiment the object holder assembly 26 is embodied as a tray portion 74 received within the instrument panel 10 that can be selectively moved from a recessed position to an extended position (as shown). To extend the tray 74, the tray 74 can be manually pulled out of the instrument panel 10, or can be latch and spring (not shown) biased such that depressing the tray 74, or otherwise actuating the latch, causes the latch to release and the spring to bias the tray 74 in an outward direction. Adjacent the tray, there is preferably a base panel 76 that is pivotably attached to the tray 74. The base panel 76 is connected to the tray 74 by pivotable arms 78. The arms 78 (shown only on one side of the assembly 26), act to move the base panel 76 when the tray 74 is moved. Thus, as the tray 74 is extended from the instrument panel 10, the arms 78 release to allow the base 76 to move away from the tray 74. As the tray 74 is moved to the retracted position, the arms 78 swing the base panel 76 towards the tray 74 such that the base panel 76' is positioned adjacent the tray 74 as the assembly 26 is moved into the instrument panel 10. Positioned adjacent the tray 74, there are a plurality of slidable panels 80 that are substantially similar to those which have been described above. Once the tray 74 has been extended, a panel 80 can be selected that generally conforms to the size and shape of the object to be supported therewith. According to the present invention, each panel would have a differently sized slot formed therein to accommodate differently sized objects, such as was described above. As illustrated, the panel 80 includes a pair of slots 82 positioned adjacent each other. It can be appreciated that the slots 82 can be the same or different sizes, or the panel 80 could be formed having only a single slot for supporting a single object therein. For demonstration purposes only, a beverage container 84 is illustrated in phantom and is positioned in one of the slots 82. The size and shape of the slots 82 can be any desired shape and size to accommodate any object.

There is illustrated in FIG. 8, an alternate embodiment of the present invention. In this embodiment, an object holder assembly 20' is positioned adjacent a vehicle armrest 86. As shown, such an embodiment would most suitably be used with a second row seat 88 and third row seat in a vehicle. However, it can be appreciated that the invention could also be used with a driver and passenger seat as well. The object holder assembly 20' is preferably substantially similar to the embodiment shown and described with respect to FIG. 1. Additionally, the entire object holder assembly 20' is retractably mounted within the armrest 86 or a vehicle console. Therefore, the object holder assembly 20' would be mounted within a recess 96 formed within the armrest 86. Thus, the armrest 86 and object holder assembly 20' would be pivotable relative to the seat 88. The armrest 86 (and the object holder assembly in a retracted position) can be positioned within a recess 90 formed in the seatback 92 when pivoted towards the seatback 92. While in the extended position, the object holder assembly 20' will preferably operate in a manner that is similar to that described above. However, it can be appreciated that the panels 93 and cover panel 94, as well as other appurtenances can be suitably modified as necessary to operate within the armrest 86. In FIG. 8, only a single panel 93 is shown in a fully extended position, it can be appreciated that multiple panels 93, including a cover panel 94, can be positioned within the object holder assembly 20' in accordance with the present invention, and as described above. Although the object holder assembly 20' is shown as being retractable within the armrest 86, it should be appreciated that the object holder assembly 20' can be fixed relative to the armrest 86, but pivotable with the armrest 86 relative to seat 88. Additionally, the panels 93 includes at least one slot 95 positioned within the panel 93. It can be appreciated that the slot 95 formed on each panel 93 can have the same or different sizes, or the panels 93 could be formed having multiple slots for supporting a single object therein formed on the panels 93.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An object holder assembly for a vehicle trim component comprising:

a vehicle trim body having an opening formed therein; and a plurality of panels movably mounted relative to said opening for movement between a retracted position and an extended position in said opening;

wherein each of said panels has a slot formed therein, said slot and said body being configured for receiving and supporting an object therein.

2. The object holder assembly defined in claim 1 positions;

wherein each successively lower panel has a generally smaller slot formed therein than the slot formed in each successively higher panel.

3. The object holder assembly defined in claim 1 wherein each panel has differently shaped slots formed therein.

4. The object holder assembly defined in claim 3 wherein said plurality of panels are stacked in a generally vertical manner.

5. The object holder assembly defined in claim 4 wherein each slot formed in each panel is generally concentrically aligned with the openings of each respectively higher and lower panel when said panels are in the extended position.

6. The object holder assembly defined in claim 3 wherein each panel has a tab extending therefrom for selectively manually gripping each panel; and selectively moving a panel causes an adjacent panel to move therewith.

7. The object holder assembly defined in claim 1 wherein the bottom of said object holder assembly has a plurality of concentric recessed rings formed thereon.

8. The object holder assembly defined in claim 3 further comprising a movably mounted cover panel wherein said cover panel is the uppermost panel and has a generally continuous surface.

9. The object holder assembly defined in claim 1 wherein said body defines a recess for receiving an object therein;

wherein each of said panels is slidably positioned within said recess for movement between an extended position and a retracted position; and wherein each of said panels has a slot formed through a surface of the panel, each lower slot being successively smaller than each successively upper slot.

10. The object holder assembly defined in claim 9 wherein said panels are stacked in a generally vertical manner when in retracted positions.

11. The object holder assembly defined in claim 9 wherein each panel has a selectable tab formed thereon, each tab being staggered relative to a tab formed on a successively higher panel.

12. The object holder assembly defined in claim 11 wherein each tab is generally perpendicular to the surface of the panel.

13. The object holder assembly defined in claim 1 wherein each of said panels has a plurality of slots formed therethrough.

14. The object holder assembly defined in claim 13 wherein said slots are positioned side by side.

15. The object holder assembly defined in claim 13 wherein said slots are positioned one in front of the other.

16. The object holder assembly defined in claim 1 wherein said object holder assembly is retractable relative to a vehicle console member.

17. An object holder assembly for a vehicle trim component comprising:

a vehicle trim body having an opening formed therein; and a panel movably mounted relative to said opening for movement between a retracted position and an extended position in said opening;

wherein said panel has a slot formed therein, said slot and said body being configured for receiving and supporting an object therein; and wherein the panel includes an arm slidably mounted on the panel adjacent the slot for effectively increasing or decreasing the size of the slot.

18. The object holder assembly defined in claim 17, wherein one of the arm and panel includes detents and the other of the arm and panel includes spurs received in the detents to help prevent movement of the arm relative to the panel.

19. The object holder assembly defined in claim 1, including a base positioned below the plurality of panels for vertically supporting a lower portion of an object, and wherein the lower platform is movably mounted in a generally vertical direction relative to the panel.

20. An object holder assembly for a vehicle trim component comprising:

a vehicle trim body having an opening formed therein; and a panel movably mounted relative to said opening for movement between a retracted position and an extended position in said opening;

wherein said panel has a slot formed therein, said slot and said body being configured for receiving and supporting an object therein; and wherein the panel is formed from a plurality of strips connected together.

* * * * *

UNITED STATES PATENT AND TRADEMARK OFFICE

CERTIFICATE OF CORRECTION

PATENT NO. : 6,942,267 B1

DATED : September 13, 2005

INVENTOR(S) : Alan Sturt

It is certified that error appears in the above-identified patent and that said Letters Patent is hereby corrected as shown below:

Column 8,
Line 54, after "claim 1" delete "positions;".

Signed and Sealed this

Thirteenth Day of December, 2005

JON W. DUDAS

*Director of the United States Patent and Trademark Office*